United States Patent
Lin et al.

(10) Patent No.: US 10,162,441 B2
(45) Date of Patent: Dec. 25, 2018

(54) CAPACITIVE TOUCH PANEL

(71) Applicant: Raydium Semiconductor Corporation, Hsinchu (TW)

(72) Inventors: Yi-Ying Lin, Hualien (TW); Hsin-Wei Shieh, New Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 138 days.

(21) Appl. No.: 15/450,214

(22) Filed: Mar. 6, 2017

(65) Prior Publication Data
US 2017/0262108 A1    Sep. 14, 2017

Related U.S. Application Data

(60) Provisional application No. 62/306,102, filed on Mar. 10, 2016.

(51) Int. Cl.
| | |
|---|---|
| *G06F 3/045* | (2006.01) |
| *G06F 3/041* | (2006.01) |
| *G02F 1/1335* | (2006.01) |
| *G02F 1/1343* | (2006.01) |
| *G06F 3/044* | (2006.01) |
| *G02F 1/1333* | (2006.01) |

(52) U.S. Cl.
CPC ...... *G06F 3/0412* (2013.01); *G02F 1/133528* (2013.01); *G02F 1/134309* (2013.01); *G06F 3/044* (2013.01); *G06F 3/0416* (2013.01); *G02F 1/13338* (2013.01); *G06F 2203/04111* (2013.01)

(58) Field of Classification Search
CPC ........... G02F 1/13338; G02F 1/133528; G02F 1/134309; G06F 2203/04111; G06F 3/0412; G06F 3/0416; G06F 3/044
See application file for complete search history.

(56) References Cited

U.S. PATENT DOCUMENTS

| | | | |
|---|---|---|---|
| 2015/0309646 A1* | 10/2015 | Nishida ................... | G06F 3/044 345/174 |
| 2016/0011694 A1* | 1/2016 | Lin ....................... | G06F 3/0418 345/174 |

* cited by examiner

*Primary Examiner* — Insa Sadio

(57) ABSTRACT

A capacitive touch panel is disclosed. A touch sensing module in its laminated structure includes same touch sensor patterns. Each touch sensor pattern includes a first electrode, a second electrode and a bridge structure. The first electrode includes a first sub-electrode~a fourth sub-electrode and the second electrode includes a fifth sub-electrode~an eighth sub-electrode formed by sections of conductive material having different slopes. First sub-electrode and second sub-electrode are symmetrical to a first direction of a first axis; third sub-electrode and fourth sub-electrode are symmetrical to a second direction of first axis. Fifth sub-electrode and sixth sub-electrode are symmetrical to a third direction of a second axis; seventh sub-electrode and eighth sub-electrode are symmetrical to a fourth direction of second axis. The bridge structure disposed at intersection of first axis and second axis bridges second electrode and provides insulation between second electrode and first electrode.

20 Claims, 7 Drawing Sheets

1

2

CAPACITIVE TOUCH PANEL

BACKGROUND OF THE INVENTION

1. Field of the Invention

This invention relates to a touch panel, especially to an on-cell capacitive touch panel having appropriately designed touch sensor patterns capable of effectively suppressing the generation of reverse signals without cover lens and optical clear adhesive (OCA)/optical clear resin (OCR) to avoid poor multi-touch sensing.

2. Description of the Prior Art

In general, the laminated structures of capacitive touch panels can be divided into several types. Among these types, the on-cell capacitive touch panel includes a touch sensor layer disposed on the glass of the display panel and has an advantage of display and touch integration to achieve the effect of light and thin. Users can directly perform a touch operation on the display panel of the electronic product without cover lens.

Please refer to FIG. 1 and FIG. 2. FIG. 1 and FIG. 2 illustrate two different laminated structures of the on-cell capacitive touch panel respectively. The difference between the laminated structure 1 of FIG. 1 and the laminated structure 2 of FIG. 2 is that the laminated structure 1 of FIG. 1 includes cover lens 18 and optical clear adhesive (OCA)/optical clear resin (OCR) 16, but the laminated structure 2 of FIG. 2 does not include them.

Although the laminated structure 2 of FIG. 2 without the cover lens and the OCA/OCR can achieve effects of simplifying laminated structure, reducing thickness, and saving costs, stronger reverse signals will be generated and multi-touch sensing of the touch panel will become poor.

SUMMARY OF THE INVENTION

Therefore, the invention provides a capacitive touch panel to solve the above-mentioned problems in the prior arts.

An embodiment of the invention is a capacitive touch panel. In this embodiment, the capacitive touch panel having an on-cell type. The capacitive touch panel includes a laminated structure. The laminated structure includes a liquid-crystal display module, a touch sensing module and a polarization module. The touch sensing module is disposed on the liquid-crystal display module. The polarization module is disposed on the touch sensing module. Wherein, the touch sensing module includes a plurality of same touch sensor patterns, and each touch sensor pattern includes a first electrode, a second electrode and a bridge structure.

The first electrode includes a first sub-electrode, a second sub-electrode, a third sub-electrode and a fourth sub-electrode, wherein the first sub-electrode, the second sub-electrode, the third sub-electrode and the fourth sub-electrode are formed by sections of conductive material having different slopes respectively, the first sub-electrode and the second sub-electrode are extended and symmetrical to a first direction of a first axis, and the third sub-electrode and the fourth sub-electrode are extended and symmetrical to a second direction of the first axis, wherein the first direction and the second of the first axis are opposite. The second electrode includes a fifth sub-electrode, a sixth sub-electrode, a seventh sub-electrode and a eighth sub-electrode, wherein the fifth sub-electrode, the sixth sub-electrode, the seventh sub-electrode and the eighth sub-electrode are formed by sections of conductive material having different slopes respectively, the fifth sub-electrode and the sixth sub-electrode are symmetrical to a third direction of a second axis and the seventh sub-electrode and the eighth sub-electrode are symmetrical to a fourth direction of the second axis, wherein the third direction and the fourth of the second axis are opposite. The bridge structure is disposed at an intersection of the first axis and the second axis and used for bridging the second electrode and providing insulation between the second electrode and the first electrode.

In an embodiment, the first sub-electrode and the third sub-electrode are symmetrical to the second axis.

In an embodiment, the second sub-electrode and the fourth sub-electrode are symmetrical to the second axis.

In an embodiment, the fifth sub-electrode and the seventh sub-electrode are symmetrical to the first axis.

In an embodiment, the sixth sub-electrode and the eighth sub-electrode are symmetrical to the first axis.

In an embodiment, the intersection of the first axis and the second axis is a center of the touch sensor pattern.

In an embodiment, the first sub-electrode and the fourth sub-electrode are symmetrical to the center.

In an embodiment, the second sub-electrode and the third sub-electrode are symmetrical to the center.

In an embodiment, the fifth sub-electrode and the eighth sub-electrode are symmetrical to the center.

In an embodiment, the fifth sub-electrode and the eighth sub-electrode are symmetrical to the center.

In an embodiment, the bridge structure includes a conductive layer and an insulating layer. The conductive layer is used for bridging the fifth sub-electrode, the sixth sub-electrode, the seventh sub-electrode and the eighth sub-electrode of the second electrode. The insulating layer is disposed between the conductive layer and the first electrode and used for providing insulation between the first electrode and the conductive layer bridging the second electrode.

In an embodiment, the touch sensor pattern also comprises a dummy electrode disposed out of the first electrode and the second electrode and there is a fixed space between the dummy electrode and the first electrode and between the dummy electrode and the second electrode.

In an embodiment, the dummy electrode is floating.

In an embodiment, an area of the dummy electrode is larger than an area of the first electrode and an area of the second electrode.

In an embodiment, a width of the first electrode ranges between 150~450 um.

In an embodiment, a width of the second electrode ranges between 150~450 um.

In an embodiment, the first axis is Y axis and the first direction and the second direction are a positive direction and a negative direction of the Y axis.

In an embodiment, the second axis is X axis and the third direction and the fourth direction are a positive direction and a negative direction of the X axis.

In an embodiment, the first electrode is used as touch driving electrode and the second electrode is used as touch sensing electrode.

In an embodiment, the first electrode is used as touch sensing electrode and the second electrode is used as touch driving electrode.

Compared to the prior art, the on-cell capacitive touch panel of the invention having appropriately designed touch sensor patterns capable of effectively suppressing the generation of reverse signals without cover lens and optical clear adhesive (OCA)/optical clear resin (OCR) to obtain enough touch signal sensing amount and avoid poor multi-touch sensing.

The advantage and spirit of the invention may be understood by the following detailed descriptions together with the appended drawings.

BRIEF DESCRIPTION OF THE APPENDED DRAWINGS

FIG. 5~FIG. 12 illustrate different embodiments of the touch sensor pattern of the on-cell capacitive touch panel of the invention.

DETAILED DESCRIPTION OF THE INVENTION

Figure 1:
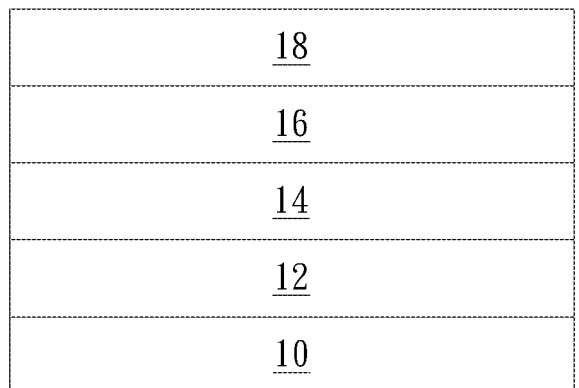
FIG. 1 and FIG. 2 illustrate two different laminated structures of the on-cell capacitive touch panel respectively.
Figure 2:
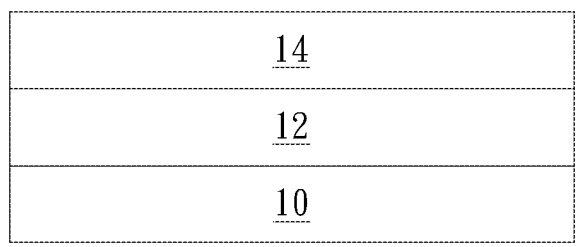

A preferred embodiment of the invention is a capacitive touch panel. In this embodiment, the capacitive touch panel has on-cell type, as shown in the laminated structure 2 of FIG. 2, the touch sensing module 12 is disposed on the liquid-crystal display module 10 and the polarization module 14 is disposed on the touch sensing module 12 without the cover lens 18 and the optical clear adhesive (OCA)/optical clear resin (OCR) 16 in the laminated structure 1 of FIG. 1.

It should be noticed that in order to avoid the drawbacks of the prior arts, the invention provides improved touch sensor patterns in the touch sensing module 12.

Figure 3:
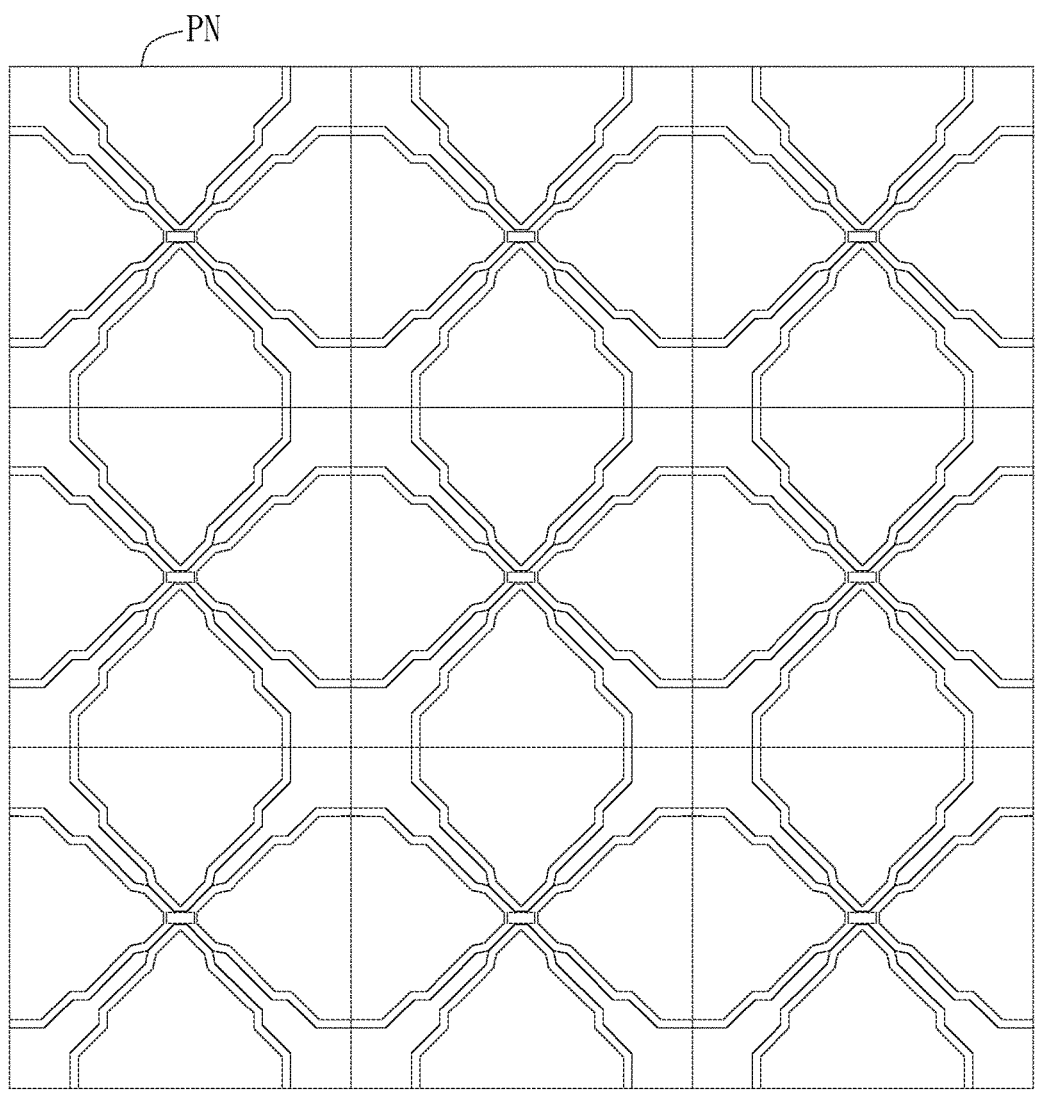
FIG. 3 illustrates the touch sensing module of the on-cell capacitive touch panel including a plurality of same touch sensor patterns.

At first, please refer to FIG. 3. FIG. 3 illustrates the touch sensing module 12 of the on-cell capacitive touch panel including a plurality of same touch sensor patterns PN, and the plurality of same touch sensor patterns PN can be arranged in a form of matrix, such as a (3×3) matrix in FIG. 3, but not limited to this.

Figure 4A:
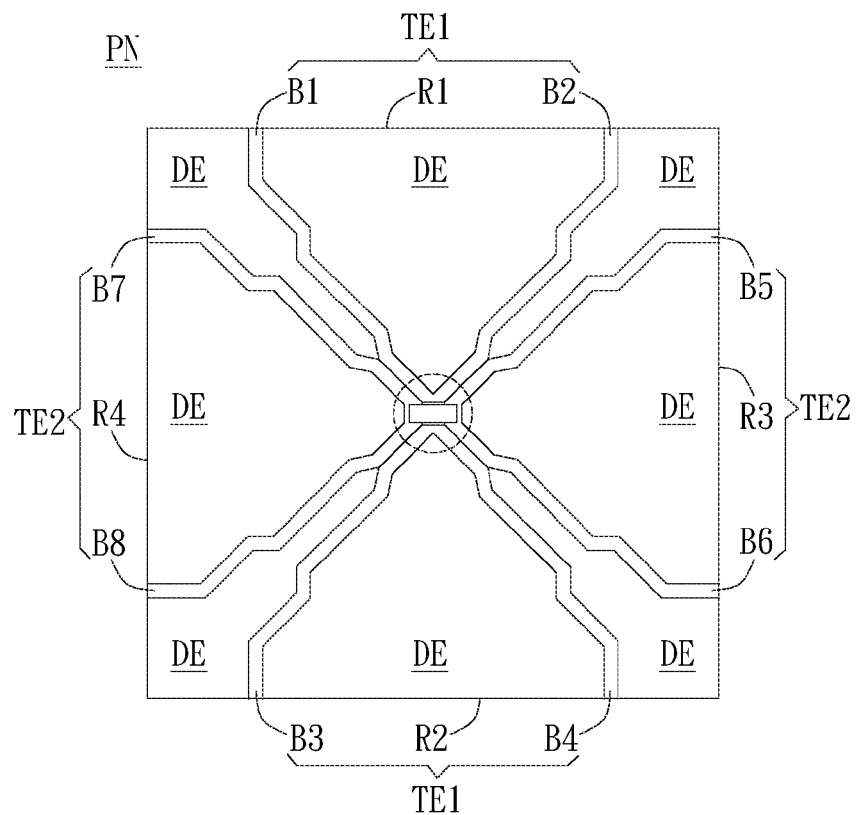
FIG. 4A illustrates an embodiment of the touch sensor pattern of the on-cell capacitive touch panel of the invention.
Figure 4B:
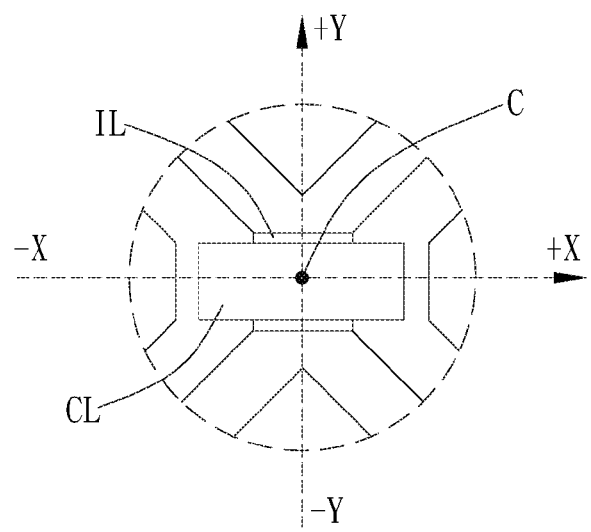
FIG. 4B illustrates an enlarged diagram of the dotted-line region in FIG. 4A.

Then, please refer to FIG. 4A and FIG. 4B. FIG. 4A illustrates an embodiment of the touch sensor pattern PN in FIG. 3 and FIG. 4B illustrates an enlarged diagram of the dotted-line region in FIG. 4A.

As shown in FIG. 4A and FIG. 4B, the touch sensor pattern includes a first touch electrode TE1, a second touch electrode TE2, a dummy electrode DE and a bridge structure BS. Wherein, the first touch electrode TE1 includes a first sub-electrode B1, a second sub-electrode B2, a third sub-electrode B3 and a fourth sub-electrode B4, wherein the first sub-electrode B1, the second sub-electrode B2, the third sub-electrode B3 and the fourth sub-electrode B4 are formed by sections of conductive material having different slopes respectively and have the same width, such as the width between 150~450 um; the second touch electrode TE2 includes a fifth sub-electrode B5, a sixth sub-electrode B6, a seventh sub-electrode B7 and an eighth sub-electrode B8, wherein the fifth sub-electrode B5, the sixth sub-electrode B6, the seventh sub-electrode B7 and the eighth sub-electrode B8 are formed by sections of conductive material having different slopes respectively and have the same width, such as the width between 150~450 um; the dummy electrode DE is disposed out of the first touch electrode TE1 and the second touch electrode TE2 in the touch sensor pattern PN and there is a fixed space between the dummy electrode DE and the first touch electrode TE1 and between the dummy electrode DE and the second touch electrode TE2. The dummy electrode DE is floating and an area of the dummy electrode DE is larger than an area of the first touch electrode TE1 and an area of the second touch electrode TE2. The touch sensor pattern PN has a center C, and the center C of the touch sensor pattern PN is an intersection of the vertical Y-axis and the horizontal X-axis. The bridge structure BS is disposed at the intersection of the Y-axis and the X-axis (namely the center C of the touch sensor pattern PN) and used for bridging the second touch electrode TE2 and providing insulation between the second touch electrode TE2 and the first touch electrode TE1.

It should be noticed that the width of the first touch electrode TE1 and the width of the second touch electrode TE2 can be the same or different depending on practical needs. The conductive material forming the first touch electrode TE1 and the second touch electrode TE2 can be indium tin oxide (ITO), nano-silver or carbon nanotubes, but not limited to this. Under the mutual-capacitive touch sensing mode, the first touch electrode TE1 can be used as touch driving electrode and the second touch electrode TE2 can be used as touch sensing electrode, or the first touch electrode TE1 can be used as touch sensing electrode and the second touch electrode TE2 can be used as touch driving electrode depending on different practical applications.

As to the first touch electrode TE1, the first sub-electrode B1, the second sub-electrode B2, the third sub-electrode B3 and the fourth sub-electrode B4 are connected; as to the second touch electrode TE2, the fifth sub-electrode B5, the sixth sub-electrode B6, the seventh sub-electrode B7 and the eighth sub-electrode B8 are connected; the fifth sub-electrode B5 and the sixth sub-electrode B6 are connected with the seventh sub-electrode B7 and the eighth sub-electrode B8 through the conductive layer CL of the bridge structure BS. The insulating layer IL of the bridge structure BS is disposed between the conductive layer CL of the second touch electrode TE2 and the first touch electrode TE1 and used for providing insulation between the first touch electrode TE1 and the conductive layer CL bridging the second touch electrode TE2.

The first sub-electrode B1 and the second sub-electrode B2 of the first touch electrode TE1 are extended along the positive direction +Y of Y axis from the center C and symmetrical to the positive direction +Y of Y axis; the third sub-electrode B3 and the fourth sub-electrode B4 of the first touch electrode TE1 are extended along the negative direction −Y of Y axis from the center C and symmetrical to the negative direction −Y of Y axis. Obviously, the positive direction +Y and the negative direction −Y of Y axis are opposite.

In addition, the first sub-electrode B1 and the third sub-electrode B3 are symmetrical to the negative direction −X of X axis; the second sub-electrode B2 and the fourth sub-electrode B4 are symmetrical to the positive direction +X of X axis. The first sub-electrode B1 and the fourth sub-electrode B4 are symmetrical to the center C; the second sub-electrode B2 and the third sub-electrode B3 are symmetrical to the center C.

The fifth sub-electrode B5 and the sixth sub-electrode B6 of the second touch electrode TE2 are extended along the positive direction +X of X axis from the center C and symmetrical to the positive direction +X of X axis; the seventh sub-electrode B7 and the eighth sub-electrode B8 of the second touch electrode TE2 are extended along the negative direction −X of X axis from the center C and symmetrical to the negative direction −X of X axis. Obviously, the positive direction +X and the negative direction −X of X axis are opposite.

In addition, the fifth sub-electrode B5 and the seventh sub-electrode B7 are symmetrical to the positive direction +Y of Y axis; the sixth sub-electrode B6 and the eighth sub-electrode B8 are symmetrical to the negative direction −Y of Y axis. The fifth sub-electrode B5 and the eighth sub-electrode B8 are symmetrical to the center C; the sixth sub-electrode B6 and the seventh sub-electrode B7 are symmetrical to the center C.

It should be noticed that, in the touch sensor pattern PN shown in FIG. 4A, the first sub-electrode B1, the second sub-electrode B2, the third sub-electrode B3 and the fourth sub-electrode B4 of the first touch electrode TE1 and the fifth sub-electrode B5, the sixth sub-electrode B6, the seventh sub-electrode B7 and the eighth sub-electrode B8 of the second touch electrode TE2 are all formed by six connected sections of conductive material having different slopes, but not limited to this.

It is assumed that the touch sensor pattern PN has a first edge R1, a second edge R2, a third edge R3 and a fourth edge R4, wherein the first edge R1 and the second edge R2 are opposite and the third edge R3 and the fourth edge R4 are opposite. In this embodiment, the first sub-electrode B1 and the second sub-electrode B2 of the first touch electrode TE1 extend to the first edge R1 of the touch sensor pattern PN; the third sub-electrode B3 and the fourth sub-electrode B4 of the first touch electrode TE1 extend to the second edge R2 of the touch sensor pattern PN; the fifth sub-electrode B5 and the sixth sub-electrode B6 of the second touch electrode TE2 extend to the third edge R3 of the touch sensor pattern PN; the seventh sub-electrode B7 and the eighth sub-electrode B8 of the second touch electrode TE2 extend to the fourth edge R4 of the touch sensor pattern PN.

Next, please also refer to FIG. 5~FIG. 12. FIG. 5~FIG. 12 illustrate different embodiments of the touch sensor pattern of the on-cell capacitive touch panel of the invention.

Figure 5:
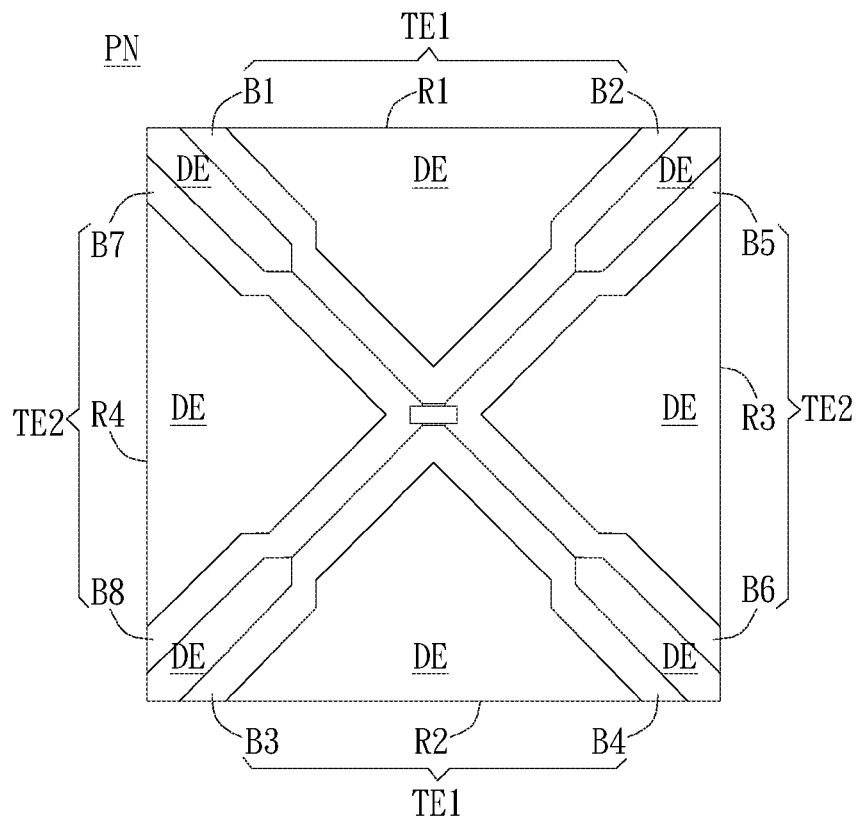

As shown in FIG. 5, the first sub-electrode B1, the second sub-electrode B2, the third sub-electrode B3 and the fourth sub-electrode B4 of the first touch electrode TE1 and the fifth sub-electrode B5, the sixth sub-electrode B6, the seventh sub-electrode B7 and the eighth sub-electrode B8 of the second touch electrode TE2 are all formed by three connected sections of conductive material having different slopes, but not limited to this.

Figure 6:
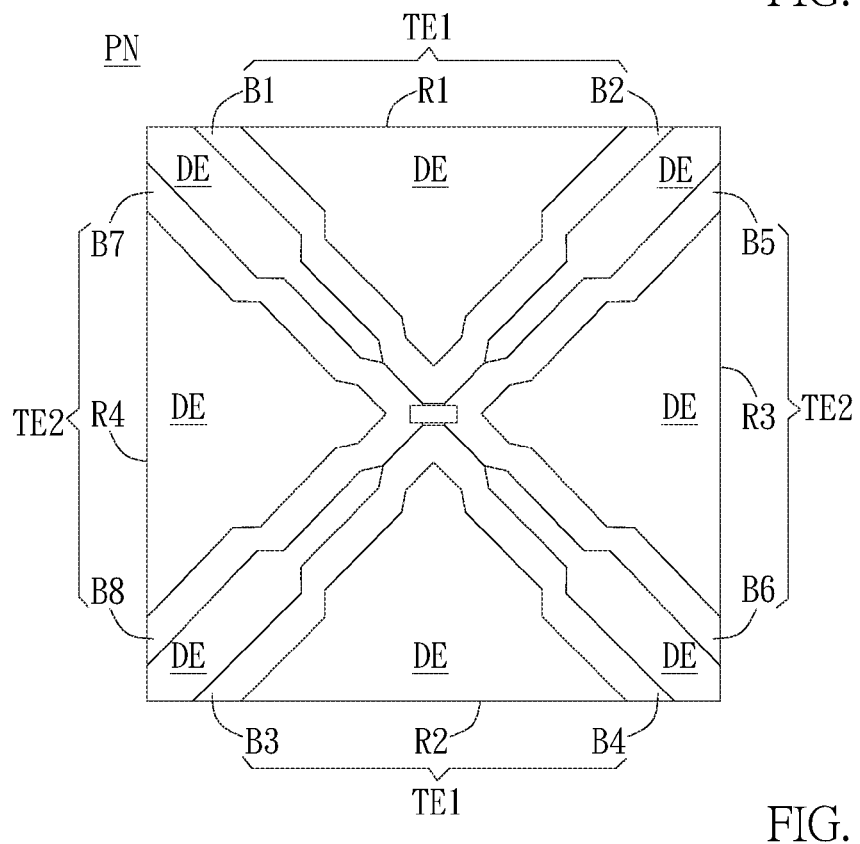

As shown in FIG. 6, the first sub-electrode B1, the second sub-electrode B2, the third sub-electrode B3 and the fourth sub-electrode B4 of the first touch electrode TE1 and the fifth sub-electrode B5, the sixth sub-electrode B6, the seventh sub-electrode B7 and the eighth sub-electrode B8 of the second touch electrode TE2 are all formed by five connected sections of conductive material having different slopes, but not limited to this.

Figure 7:
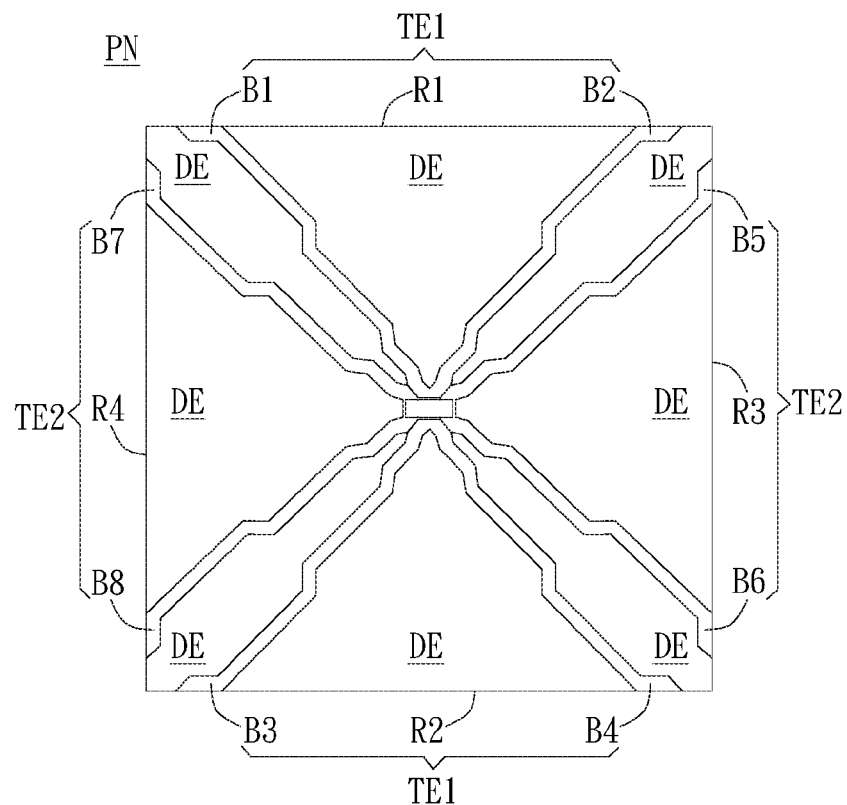

As shown in FIG. 7, the first sub-electrode B1, the second sub-electrode B2, the third sub-electrode B3 and the fourth sub-electrode B4 of the first touch electrode TE1 and the fifth sub-electrode B5, the sixth sub-electrode B6, the seventh sub-electrode B7 and the eighth sub-electrode B8 of the second touch electrode TE2 are all formed by seven connected sections of conductive material having different slopes, but not limited to this.

Figure 8:
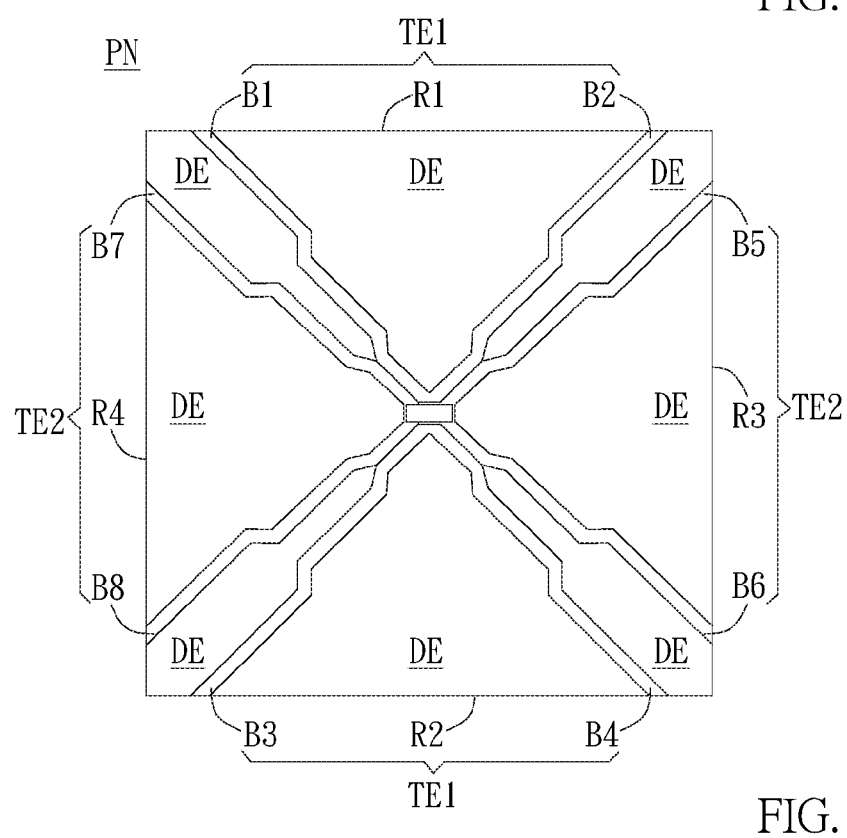

As shown in FIG. 8, the first sub-electrode B1, the second sub-electrode B2, the third sub-electrode B3 and the fourth sub-electrode B4 of the first touch electrode TE1 and the fifth sub-electrode B5, the sixth sub-electrode B6, the seventh sub-electrode B7 and the eighth sub-electrode B8 of the second touch electrode TE2 are all formed by five connected sections of conductive material having different slopes, but not limited to this. Compared FIG. 8 with FIG. 6, it can be found that the width of the first touch electrode TE1 and the second touch electrode TE2 in FIG. 8 is smaller than that in FIG. 6.

Figure 9:
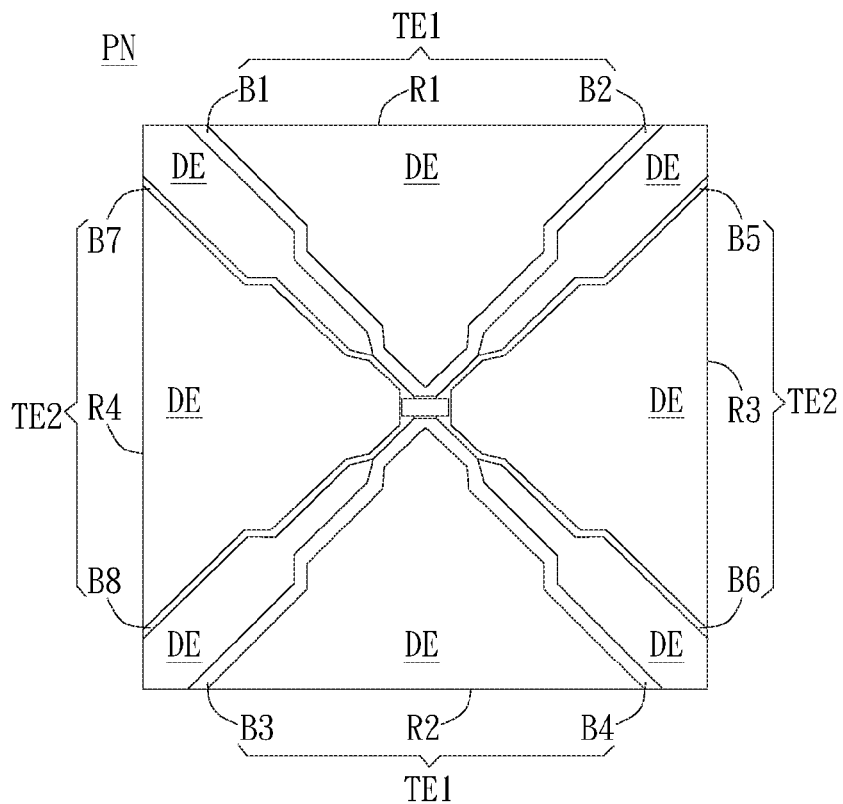

As shown in FIG. 9, the first sub-electrode B1, the second sub-electrode B2, the third sub-electrode B3 and the fourth sub-electrode B4 of the first touch electrode TE1 and the fifth sub-electrode B5, the sixth sub-electrode B6, the seventh sub-electrode B7 and the eighth sub-electrode B8 of the second touch electrode TE2 are all formed by five connected sections of conductive material having different slopes, but not limited to this. Different from FIG. 8, the width of the fifth sub-electrode B5, the sixth sub-electrode B6, the seventh sub-electrode B7 and the eighth sub-electrode B8 of the second touch electrode TE2 is smaller than that of the first sub-electrode B1, the second sub-electrode B2, the third sub-electrode B3 and the fourth sub-electrode B4 of the first touch electrode TE1 in FIG. 9.

Figure 10:
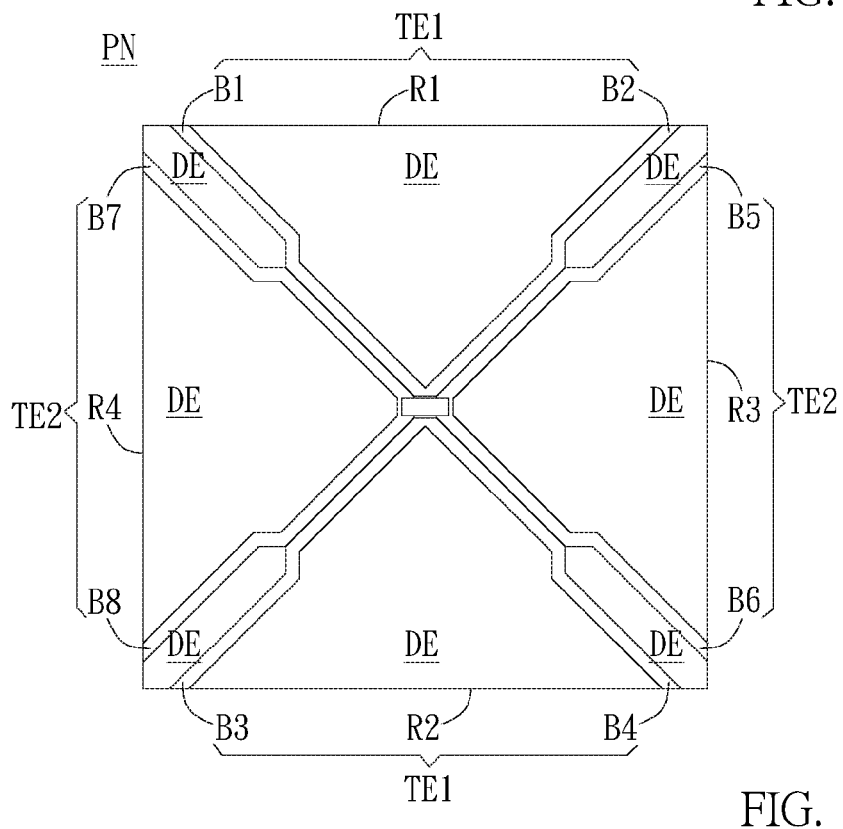

As shown in FIG. 10, the first sub-electrode B1, the second sub-electrode B2, the third sub-electrode B3 and the fourth sub-electrode B4 of the first touch electrode TE1 and the fifth sub-electrode B5, the sixth sub-electrode B6, the seventh sub-electrode B7 and the eighth sub-electrode B8 of the second touch electrode TE2 are all formed by three connected sections of conductive material having different slopes, but not limited to this. Compared FIG. 10 with FIG. 5, it can be found that the width of the first touch electrode TE1 and the second touch electrode TE2 in FIG. 10 is smaller than that in FIG. 5.

Figure 11:
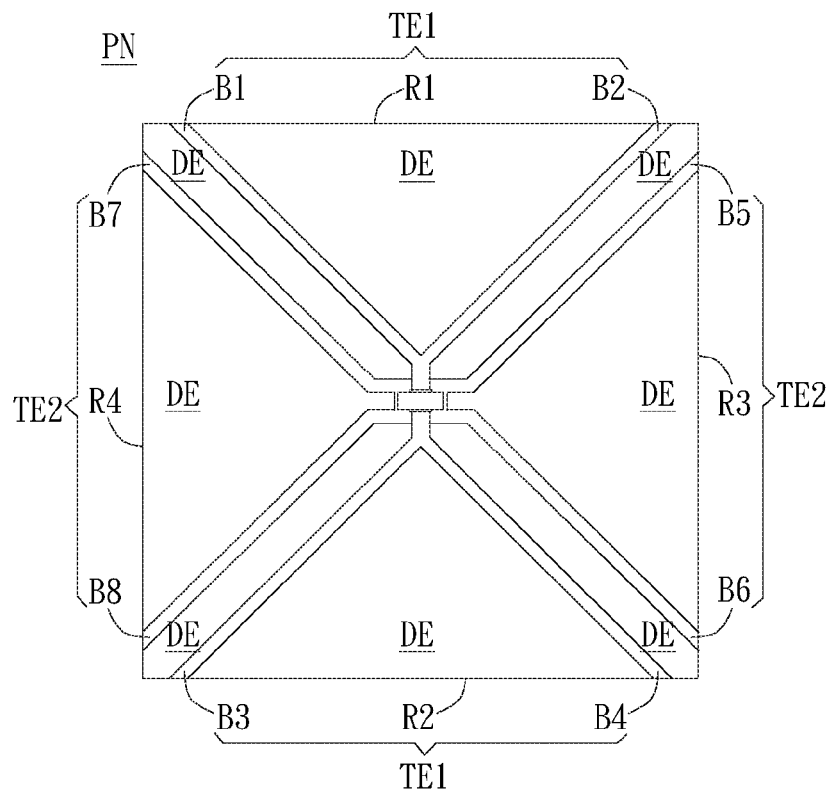

As shown in FIG. 11, the first sub-electrode B1, the second sub-electrode B2, the third sub-electrode B3 and the fourth sub-electrode B4 of the first touch electrode TE1 and the fifth sub-electrode B5, the sixth sub-electrode B6, the seventh sub-electrode B7 and the eighth sub-electrode B8 of the second touch electrode TE2 are all formed by two connected sections of conductive material having different slopes, but not limited to this.

Figure 12:
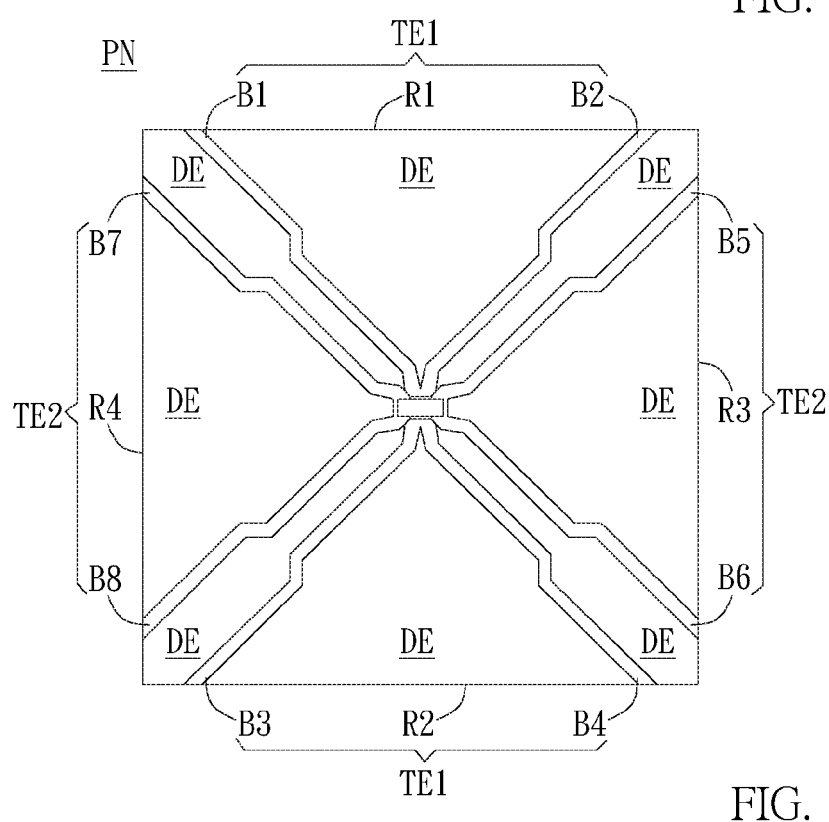

As shown in FIG. 12, the first sub-electrode B1, the second sub-electrode B2, the third sub-electrode B3 and the fourth sub-electrode B4 of the first touch electrode TE1 and the fifth sub-electrode B5, the sixth sub-electrode B6, the seventh sub-electrode B7 and the eighth sub-electrode B8 of the second touch electrode TE2 are all formed by four connected sections of conductive material having different slopes, but not limited to this.

Compared to the prior art, the on-cell capacitive touch panel of the invention having appropriately designed touch sensor patterns capable of effectively suppressing the generation of reverse signals without cover lens and optical clear adhesive (OCA)/optical clear resin (OCR) to obtain enough touch signal sensing amount and avoid poor multi-touch sensing.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:
1. A capacitive touch panel having an on-cell type, the capacitive touch panel comprising:
 a laminated structure, comprising:
  a liquid-crystal display module;

a touch sensing module disposed on the liquid-crystal display module; and a polarization module disposed on the touch sensing module;

wherein the touch sensing module comprises a plurality of same touch sensor patterns, and each touch sensor pattern comprises:

a first electrode comprising a first sub-electrode, a second sub-electrode, a third sub-electrode and a fourth sub-electrode, wherein the first sub-electrode, the second sub-electrode, the third sub-electrode and the fourth sub-electrode are formed by sections of conductive material having different slopes respectively, the first sub-electrode and the second sub-electrode are extended and symmetrical to a first direction of a first axis, and the third sub-electrode and the fourth sub-electrode are extended and symmetrical to a second direction of the first axis, wherein the first direction and the second of the first axis are opposite;

a second electrode comprising a fifth sub-electrode, a sixth sub-electrode, a seventh sub-electrode and a eighth sub-electrode, wherein the fifth sub-electrode, the sixth sub-electrode, the seventh sub-electrode and the eighth sub-electrode are formed by sections of conductive material having different slopes respectively, the fifth sub-electrode and the sixth sub-electrode are symmetrical to a third direction of a second axis and the seventh sub-electrode and the eighth sub-electrode are symmetrical to a fourth direction of the second axis, wherein the third direction and the fourth of the second axis are opposite; and a bridge structure, disposed at an intersection of the first axis and the second axis, for bridging the second electrode and providing insulation between the second electrode and the first electrode.

2. The capacitive touch panel of claim 1, wherein the first sub-electrode and the third sub-electrode are symmetrical to the second axis.

3. The capacitive touch panel of claim 1, wherein the second sub-electrode and the fourth sub-electrode are symmetrical to the second axis.

4. The capacitive touch panel of claim 1, wherein the fifth sub-electrode and the seventh sub-electrode are symmetrical to the first axis.

5. The capacitive touch panel of claim 1, wherein the sixth sub-electrode and the eighth sub-electrode are symmetrical to the first axis.

6. The capacitive touch panel of claim 1, wherein the intersection of the first axis and the second axis is a center of the touch sensor pattern.

7. The capacitive touch panel of claim 6, wherein the first sub-electrode and the fourth sub-electrode are symmetrical to the center.

8. The capacitive touch panel of claim 6, wherein the second sub-electrode and the third sub-electrode are symmetrical to the center.

9. The capacitive touch panel of claim 6, wherein the fifth sub-electrode and the eighth sub-electrode are symmetrical to the center.

10. The capacitive touch panel of claim 6, wherein the sixth sub-electrode and the seventh sub-electrode are symmetrical to the center.

11. The capacitive touch panel of claim 1, wherein the bridge structure comprises:

a conductive layer for bridging the fifth sub-electrode, the sixth sub-electrode, the seventh sub-electrode and the eighth sub-electrode of the second electrode; and an insulating layer, disposed between the conductive layer and the first electrode, for providing insulation between the first electrode and the conductive layer bridging the second electrode.

12. The capacitive touch panel of claim 1, wherein the touch sensor pattern also comprises a dummy electrode disposed out of the first electrode and the second electrode and there is a fixed space between the dummy electrode and the first electrode and between the dummy electrode and the second electrode.

13. The capacitive touch panel of claim 12, wherein the dummy electrode is floating.

14. The capacitive touch panel of claim 12, wherein an area of the dummy electrode is larger than an area of the first electrode and an area of the second electrode.

15. The capacitive touch panel of claim 1, wherein a width of the first electrode ranges between 150~450 um.

16. The capacitive touch panel of claim 1, wherein a width of the second electrode ranges between 150~450 um.

17. The capacitive touch panel of claim 1, wherein the first axis is Y axis and the first direction and the second direction are a positive direction and a negative direction of the Y axis.

18. The capacitive touch panel of claim 1, wherein the second axis is X axis and the third direction and the fourth direction are a positive direction and a negative direction of the X axis.

19. The capacitive touch panel of claim 1, wherein the first electrode is used as touch driving electrode and the second electrode is used as touch sensing electrode.

20. The capacitive touch panel of claim 1, wherein the first electrode is used as touch sensing electrode and the second electrode is used as touch driving electrode.

* * * * *